US012599976B2

(12) United States Patent
Yamada

(10) Patent No.: US 12,599,976 B2
(45) Date of Patent: Apr. 14, 2026

(54) ROTARY CUTTING TOOL

(71) Applicant: KANEFUSA KABUSHIKI KAISHA, Aichi (JP)

(72) Inventor: Yasunari Yamada, Aichi (JP)

(73) Assignee: KANEFUSA KABUSHIKI KAISHA, Aichi (JP)

( * ) Notice: Subject to any disclaimer, the term of this patent is extended or adjusted under 35 U.S.C. 154(b) by 190 days.

(21) Appl. No.: 18/576,461

(22) PCT Filed: Mar. 31, 2022

(86) PCT No.: PCT/JP2022/016737
§ 371 (c)(1),
(2) Date: Jan. 4, 2024

(87) PCT Pub. No.: WO2023/281889
PCT Pub. Date: Jan. 12, 2023

(65) Prior Publication Data
US 2024/0326139 A1      Oct. 3, 2024

(30) Foreign Application Priority Data

Jul. 8, 2021     (JP) ................................. 2021-113880

(51) Int. Cl.
*B23C 5/06*          (2006.01)
(52) U.S. Cl.
CPC ............ *B23C 5/06* (2013.01); *B23C 2200/08* (2013.01); *B23C 2200/28* (2013.01); *B23C 2228/49* (2013.01)

(58) Field of Classification Search
CPC ... B23C 5/06; B23C 2200/08; B23C 2200/28; B23C 2228/49
See application file for complete search history.

(56) References Cited

U.S. PATENT DOCUMENTS 4,511,293 A * 4/1985 Shimomura ............ B23C 5/202
                                                        407/41
4,717,290 A      1/1988 Reynolds et al.
(Continued)

FOREIGN PATENT DOCUMENTS

CN          101460276 A      6/2009
CN          108290231 A      7/2018
(Continued)

OTHER PUBLICATIONS

Chinese Office Action issued May 7, 2024 in corresponding Chinese Application No. 202280039237.3 (with English machine translation), 9 pages.
(Continued)

*Primary Examiner* — Sara Addisu
(74) *Attorney, Agent, or Firm* — Oblon, McClelland, Maier & Neustadt, L.L.P.

(57)          ABSTRACT
A rotary cutting tool, which is excellent in defect resistance and has a stable lifespan, includes a rake surface composed of one surface, a cutting edge angle that is larger than 0° and smaller than 90°, a true rake angle that is not smaller than −42° and not larger than −13°, and a major cutting edge inclination angle that is not smaller than −5° and smaller than +5°. A wiper insert is preferably formed in a rounded convex shape.

3 Claims, 5 Drawing Sheets

(56) References Cited

U.S. PATENT DOCUMENTS

| | | | | |
|---|---|---|---|---|
| 5,807,031 | A * | 9/1998 | Arai | B23C 5/202 |
| | | | | 407/115 |
| 9,884,378 | B2 | 2/2018 | Ishi et al. | |
| 10,124,426 | B2 | 11/2018 | Ishi et al. | |
| 10,799,956 | B2 | 10/2020 | Kiuchi et al. | |
| 2010/0221076 | A1 | 9/2010 | Takahashi et al. | |
| 2016/0288224 | A1 | 10/2016 | Ishi et al. | |
| 2017/0120351 | A1 * | 5/2017 | Fang | B23C 5/205 |
| 2018/0117686 | A1 | 5/2018 | Ishi et al. | |
| 2020/0086403 | A1 * | 3/2020 | Kumoi | B23C 5/06 |
| 2020/0254529 | A1 | 8/2020 | Kiuchi et al. | |
| 2022/0203460 | A1 * | 6/2022 | Burtscher | B23C 5/202 |
| 2023/0381871 | A1 * | 11/2023 | Hanamura | B23C 5/202 |
| 2024/0001462 | A1 * | 1/2024 | Lee | B23C 5/205 |

FOREIGN PATENT DOCUMENTS

| | | | | | |
|---|---|---|---|---|---|
| DE | 102005022197 | A1 * | 11/2006 | | B23B 51/06 |
| EP | 703032 | A1 * | 5/1995 | | |
| JP | 48-24462 | B1 | 7/1973 | | |
| JP | 51-102877 | U | 8/1976 | | |
| JP | 53-99586 | A | 8/1978 | | |
| JP | 58-47422 | U | 3/1983 | | |
| JP | 63-17610 | Y2 | 5/1988 | | |
| JP | 3-7411 | U | 1/1991 | | |
| JP | 5-32165 | B2 | 5/1993 | | |
| JP | 8-323510 | A | 12/1996 | | |
| JP | 2520539 | Y2 | 12/1996 | | |
| JP | 2005-118960 | A | 5/2005 | | |
| WO | WO-2011024595 | A1 * | 3/2011 | | B23C 5/006 |
| WO | WO 2015/076216 | A1 | 5/2015 | | |

OTHER PUBLICATIONS

Zhang Zongcheng, "Surface milling cutter and its parameter selection", Metal processing (cold working), (21), 2011 (www.metalworking1950.com) (with English machine translation), pp. 43-46.

International Search Report & Written Opinion mailed on Jun. 21, 2022 in PCT/JP2022/016737 filed on Mar. 31, 2022 (12 pages).

Notification of Reasons for Refusal issued Oct. 17, 2023, in JP Application No. 2023-53344, 16 pages (with English Translation).

Decision to Grant issued Dec. 5, 2023, in JP Application No. 2023-533441, 5 pages (with English Translation).

* cited by examiner

ROTARY CUTTING TOOL

TECHNICAL FIELD

The present invention relates to a rotary cutting tool such as a milling cutter.

BACKGROUND ART

A conventional face mill for machining high hardness steel such as cast iron is designed so as to have a negative rake angle, in order to increase a blade angle from the viewpoint of assuring the strength of a cutting edge. Therefore, a negative chamfer having an angle of about 15 to 45° is generally applied to the cutting edge, and thus a negative chamfer portion inevitably forms a ridgeline, at a corner formed by a major cutting edge and a wiper insert. Since stress is concentrated on a part of this ridgeline during cutting, the risk of chipping starting from such a part is always involved. Therefore, the cutting edge may be chipped before the lifespan ends due to wear of the cutting edge, so that the lifespan greatly varies. Accordingly, a cutting edge needs to be designed so as to reduce portions on which stress that is one of factors causing the chipping is concentrated.

CITATION LIST

Patent Literature

Patent Literature 1: JP48-24462 (B)
Patent Literature 2: JP2520539 (Y)
Patent Literature 3: JP63-17610 (Y)
Patent Literature 4: JP5-32165 (B)

SUMMARY OF INVENTION

Technical Problem

The present invention has been completed in consideration of the above circumstances. An object of the present invention is to provide a rotary cutting tool which is excellent in defect resistance and has a stable lifespan.

Solution to Problem

In order to attain the aforementioned object, a rotary cutting tool of the present invention has a rake surface composed of one surface, a cutting edge angle that is larger than 0° and smaller than 90°, a true rake angle that is not smaller than −42° and not larger than −13°, and a major cutting edge inclination angle that is not smaller than −5° and smaller than +5°.

In particular, a wiper insert is preferably formed in a rounded shape convex in a front end direction.

Advantageous Effects of Invention

The rotary cutting tool of the present invention has the above-described components, whereby stress is not concentrated on any portion during cutting and defect resistance is improved as compared to a conventional configuration, so that a stable lifespan is obtained. In addition, no negative chamfer needs to be applied to a cutting edge, and thus the rotary cutting tool is manufactured at lower cost than a conventional one.

BRIEF DESCRIPTION OF DRAWINGS

FIG. 1 is a cross-sectional view of a rotary cutting tool of an embodiment;

FIG. 7 is an enlarged photograph of a tip of a rotary cutting tool in Example 2 as taken when a cutting distance was 108 m; and FIG. 8 is an enlarged photograph of a tip of the rotary cutting tool in Comparative Example as taken when the cutting distance was 108 m.

DESCRIPTION OF EMBODIMENT

Figure 2:
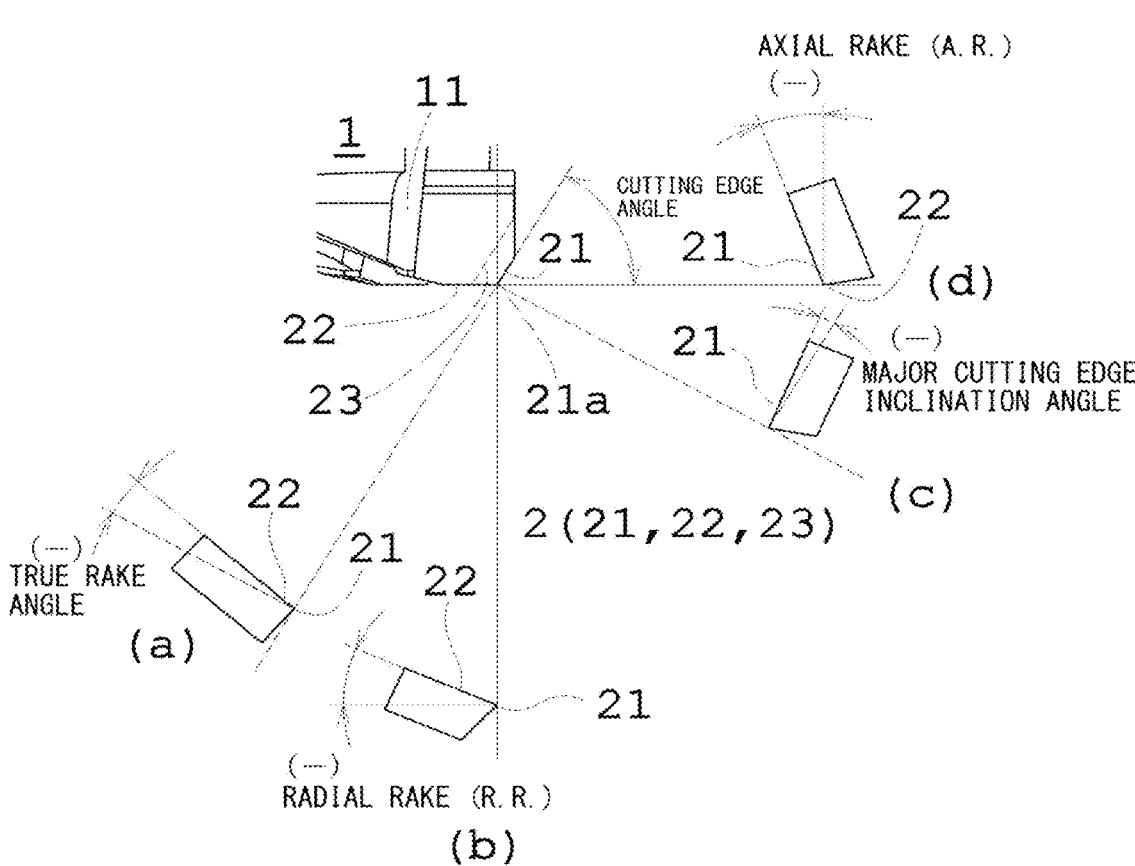
FIG. 2 illustrates a cutting edge angle of a major cutting edge, a true rake angle, a major cutting edge inclination angle, an axial rake, and a radial rake, in the rotary cutting tool of the present embodiment.

A rotary cutting tool of the present invention is described below in detail based on an embodiment. The rotary cutting tool of the present embodiment is a tool having a major cutting edge formed on the outer circumference portion, and for performing cutting work with the outer circumference portion. The major cutting edge may also be formed on a front end side. The rotary cutting tool of the present embodiment is suitably used for milling cutters such as a face mill and an end mill. The milling cutter of the present embodiment is preferably used, particularly, for machining steel materials. As used herein, a side that comes into contact with a workpiece is referred to as front end and a side opposite to the front end is referred to as rear end, in a rotation axis direction of the rotary cutting tool. When a numerical range is newly defined, numerical values described herein may be adopted discretionarily as the upper limit or the lower limit of the new numerical range, and further, the numerical values adopted for the numerical range may or may not be included.

The major cutting edge of the rotary cutting tool of the present embodiment is formed of a hard sintered body. The hard sintered body is preferably formed of ceramic such as CBN. The size of the rotary cutting tool of the present embodiment is not particularly limited. A lower limit value of an outer diameter is 10 mm, 15 mm, 20 mm, 25 mm, or 30 mm, and an upper limit value of the outer diameter is 500 mm, 300 mm, 200 mm, or 100 mm, for example. The accompanying drawings are schematic. In the drawings, for facilitating the understanding, the scale or structure of the details is emphasized or omitted. In addition, elements having the same function are denoted by the same reference character in some cases even if the elements are different.

Embodiment

Figure 1:
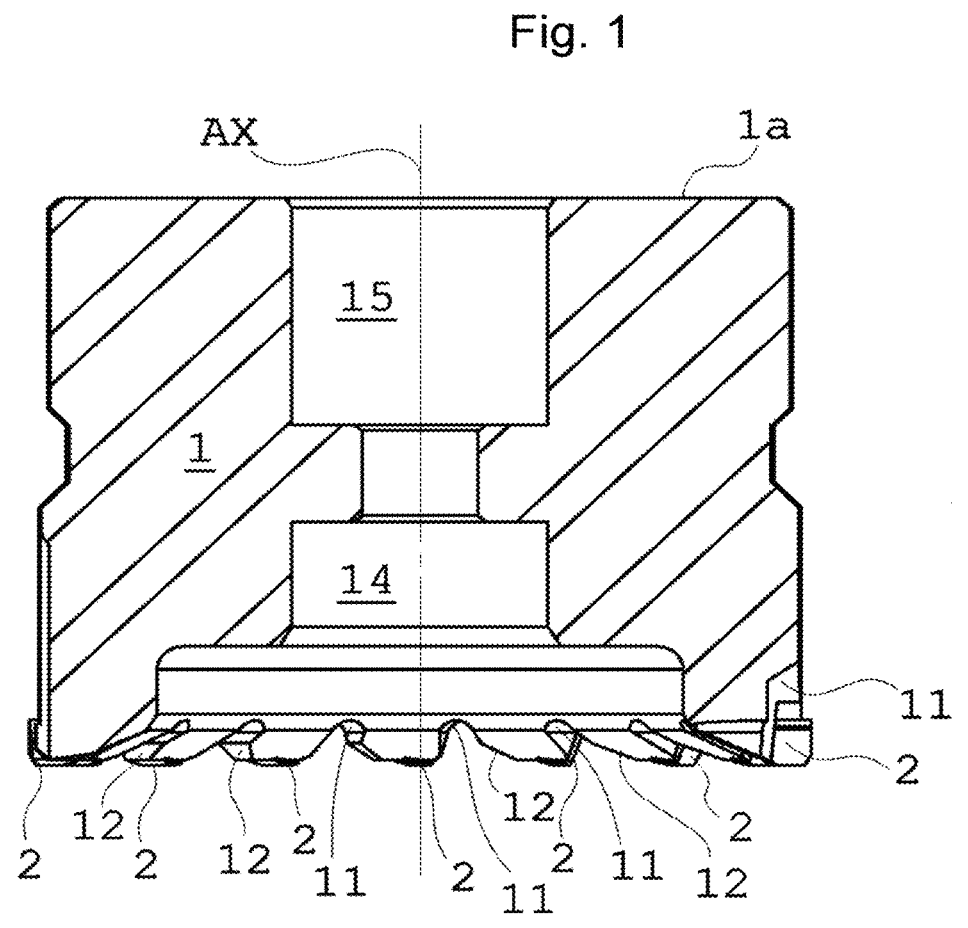

The rotary cutting tool of the present embodiment is a face mill, and rotates counterclockwise as seen from the front end side. As shown in FIG. 1, the rotary cutting tool of the present embodiment has a body 1, and sixteen tips 2 fixed evenly to an outer circumference portion of a front-end portion of the body.

FIG. 1 is a cross-sectional view of the body 1 as taken so as to include a rotation axis AX. In FIG. 1, the lower side is a front end side and the upper side is a rear end side, and a rake surface of a rightmost tip 2 out of a plurality of the tips 2 faces the front side of the drawing. In FIG. 1, intersections of both ends of a major cutting edge and other sides of the tip (wiper insert or the like), respectively, are clear, but the ends of the major cutting edge may be connected smoothly to the other sides. The rake surface is composed of one surface. The rake surface which is to be determined as being composed of one surface is a surface near the major cutting edge. That is, the rotary cutting tool of the present embodiment is formed such that a portion near the major cutting edge is composed of one surface. The reason is that, when a ridgeline at which two or more surfaces come together is present at the portion near the major cutting edge, stress is concentrated on the ridgeline, so that chipping becomes likely to occur. The portion near the major cutting edge means a portion that is distant from the major cutting edge by a distance corresponding to about a feed amount per blade or less. When a wiper insert is provided, a portion near the wiper insert is also preferably composed of one surface. In particular, in order to facilitate production, the rake surface is preferably formed as a flat surface.

The rake surface in FIG. 1 is a surface toward a major cutting edge 21 from a boundary line 23. The boundary line 23 is a line for defining the rake surface, is simply a line that is parallel to the major cutting edge 21 and is away from the major cutting edge 21 by a predetermined distance, and is not distinguished from a portion near the boundary line 23 by characteristics such as the appearance and shape.

In FIG. 2, the rightmost tip 2 in FIG. 1 is enlarged, and the tip 2 is shown so as to indicate the orientations of the major cutting edge 21 and the wiper insert 22 as seen from sight lines (a) to (d). The respective sight lines (a) to (d) pass a plane including a corner 21a and the rotation axis AX, all the sight lines (a) to (d) pass through the corner 21a, and an angle is calculated on the basis of a direction parallel to the sheet surface as seen from each sight line. The sight line (a) is for measuring a true rake angle and is an extension line of the major cutting edge 21. The sight line (b) is for measuring the radial rake and is parallel to the rotation axis AX.

The sight line (c) is for measuring a major cutting edge inclination angle and extends in a direction perpendicular to the major cutting edge. The sight line (d) is for measuring an axial rake and extends in a direction perpendicular to the rotation axis AX. In FIG. 2, a portion indicated by "(–)" in the sight lines (a) to (d) means that, in the portion, an angle indicated in the drawing has a negative value.

The body 1 is formed of alloy tool steel. The body 1 has a length of 49.5 mm in a rotation axis AX direction, an outer diameter of 62 mm, and a substantially cylindrical outer shape. The body 1 has a fitting hole 15 formed on a rear end side 1a to be connected to a machining device. The fitting hole 15 penetrates to the front-end portion, a front end hole 14 extends to a portion near the tips 2 at the front-end portion, and coolant is supplied through the front end hole 14. The face mill is fastened with a bolt to the machining device on the rear end side through the front end hole 14. Further, the body 1 may be separatable. For example, the body 1 is separated into a part for fixing the tips 2, and a part other than the part for fixing the tips 2, in the axis direction. When the material of the part other than the part for fixing the tips 2 is an aluminum alloy or the like, reduction in weight and cost is made possible. In addition, the entire body 1 need not be replaced when the tip 2 is replaced.

The tips 2 are fixed to the outer circumference portion of the front-end portion of the body 1 at equal pitches (unequal pitches are also applicable) in a circumferential direction. A method for fixing the tips 2 is, but is not particularly limited to, brazing or welding. Further, the tips 2 may also be fixed detachably by a bolt (not shown) or clamp mechanism (not shown). A groove 11 is formed on the front side, in the rotation direction, of each tip 2 (counterclockwise direction of the tips 2 as seen from the front end side). A relief 12 is formed on the back side, in the rotation direction, of each tip 2.

In each tip 2, the major cutting edge 21 and the wiper insert 22 form an angle of 120° at a corner 21a as an intersection. The wiper insert 22 has a shape that slightly protrudes in a front end direction (shape having the center portion protruding in an outer direction: rounded convex shape). The blade width of the wiper insert 22 is 1.7 mm, and the protruding length of the most greatly protruding center portion from a line segment connecting between the both ends of the blade of the wiper insert 22 is about 1.8 μm. The length of the protruding portion may be about 1 μm to 4 μm.

Each tip 2 fixed to the body 1 has a cutting edge angle larger than 0° and smaller than 90°, a true rake angle of –13° to –42°, and a major cutting edge inclination angle of –5° to +5°.

The major cutting edge 21 may have two or more cutting edge angles, may be a rounded major cutting edge, or may be a rounded major cutting edge having two or more cutting edge angles.

The cutting edge angle has an upper limit value of 65°, 75°, or 85° and a lower limit value of 15°, 20°, or 25°, and each upper limit value and each lower limit value may be discretionarily combined. The cutting edge angle influences the ratio between a component of force in the axis direction of the cutting force and a component of force in the radial direction of the cutting force, and the amount and sizes of burrs, and is discretionarily selected according to intended cutting. For example, when the cutting edge angle is not smaller than the upper limit value, the cutting force in the radial direction becomes larger and vibration of a tool likely occurs. When the cutting edge angle is not larger than the lower limit value, burrs likely occur on the cutting surface.

The true rake angle has an upper limit value of –20°, –17°, or –13° and a lower limit value of –35°, –30°, or –25°, and each upper limit value and each lower limit value may be discretionarily combined. The smaller the true rake angle is, the larger the blade angle is, and a cutting edge strength is increased. However, cutting resistance is increased and a load applied on the cutting edge is increased. When the true rake angle is not smaller than the lower limit value and not larger than the upper limit value, the cutting edge strength and the load applied on the cutting edge are balanced, and occurrence of chipping is prevented during cutting and a stable lifespan is obtained.

When the true rake angle is defined as T, the true rake angle is also calculated by tan T=Tan R×sin E+tan A×cos E in which R is a radial rake, A is an axial rake, and E is a cutting edge angle, although the true rake angle may be directly measured.

The major cutting edge inclination angle has an upper limit value of 4° or 2° and a lower limit value of –4° or –2°, and each upper limit value and each lower limit value may be discretionarily combined. In particular, the major cutting edge inclination angle is preferably in a range of –1° to 1° and more preferably about 0°. When the major cutting edge inclination angle is not smaller than the lower limit value and not larger than the upper limit value, occurrence of chipping is prevented during cutting and a stable lifespan is obtained.

When the major cutting edge inclination angle is defined as I, the major cutting edge inclination angle is also calculated by tan I=Tan A×sin E+tan R×cos E, although the major cutting edge inclination angle may be directly measured.

A radial rake R and an axial rake A are automatically determined when the cutting edge angle, the true rake angle, and the major cutting edge inclination angle are set.

EXAMPLES

Example 1

Figure 3:
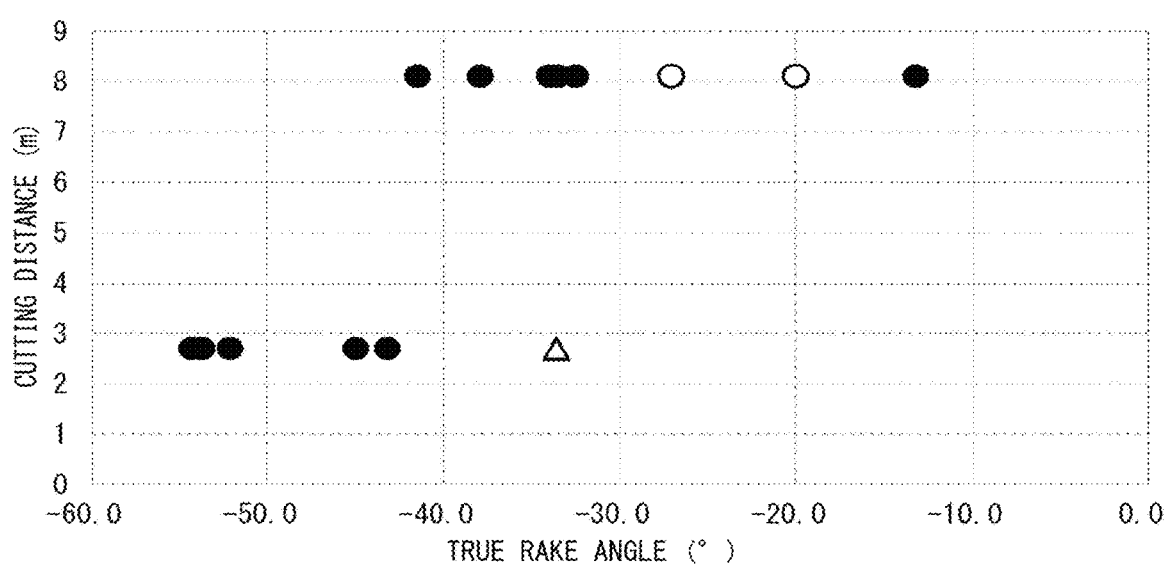
FIG. 3 is a graph showing a true rake angle dependency of a cutting distance at which a rotary cutting tool in Example 1 was chipped.
Figure 4:
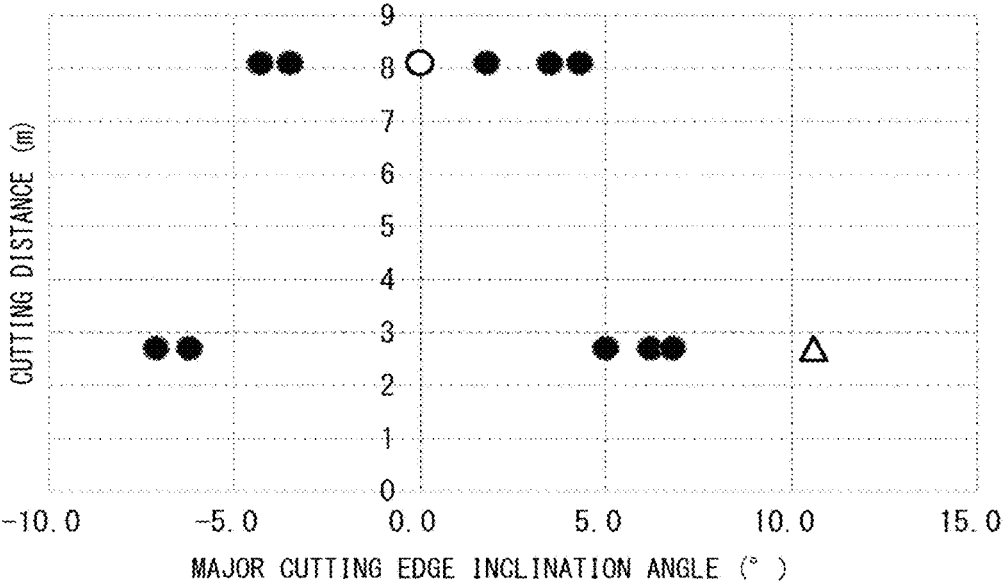
FIG. 4 is a graph showing a major cutting edge inclination angle dependency of the cutting distance at which the rotary cutting tool in Example 1 was chipped.

Hereinafter, the rotary cutting tool of the present invention will be described in detail on the basis of Example 1. A workpiece was cut using a milling cutter of each of Test Examples described in Table 1. The milling cutter of each Test Example had one tip formed of CBN and an outer diameter of 63 mm. A plate member which was formed of a ductile cast iron FCD600 and which had a width of 25 mm was used as a workpiece, and a vertical machining center was used as a machining device. A cutting condition was such that a cutting speed Vc was 600 m/min., and a feed amount fz per blade was 0.05 mm. At cutting distances of 2.7 m and 8.1 m, observation as to whether or not the major cutting edge of the milling cutter of each Test Example was chipped was performed, and each cutting distance at which chipping occurred is indicated in Table 1. In Table 1, "larger than 8.1 m" as the cutting distance at which chipping occurred means that chipping was not confirmed at the cutting distance of 8.1 m and continuous cutting beyond the distance was possible. FIG. 3 is a graph showing a true rake angle dependency of each cutting distance at which chipping occurred, and FIG. 4 is a graph showing a major cutting edge inclination angle dependency of each cutting distance at which chipping occurred.

TABLE 1

| Test Example | AR (°) | RR (°) | Chamfer angle (°) | Cutting edge angle (°) | True rake angle (°) | Cutting edge inclination angle (°) | Cutting distance (m) at which chipping occurred |
|---|---|---|---|---|---|---|---|
| 1-1 | 0 | 0 | 20 | 60 | −20 | 0 | larger than 8.1 |
| 1-2 | 0 | −5 | 30 | 45 | −33.5 | 3.5 | 8.1 |
| 1-3 | 0 | −10 | 45 | 30 | −53.7 | 5 | 2.7 |
| 1-4 | 0 | 5 | 45 | 45 | −41.5 | −3.5 | 8.1 |
| 1-5 | −5 | 0 | 30 | 30 | −32.5 | −4.3 | 8.1 |
| 1-6 | −5 | −5 | 20 | 45 | −27.1 | 0 | larger than 8.1 |
| 1-7 | −5 | −10 | 45 | 60 | −54.3 | 6.2 | 2.7 |
| 1-8 | −5 | 5 | 45 | 45 | −45 | −7.1 | 2.7 |
| 1-9 | −10 | 0 | 45 | 45 | −52.1 | −7.1 | 2.7 |
| 1-10 | −10 | −5 | 45 | 30 | −54.3 | −6.2 | 2.7 |
| 1-11 | −10 | −10 | 20 | 45 | −34 | 0 | 8.1 |
| 1-12 | 5 | 0 | 45 | 45 | −41.5 | 3.5 | 8.1 |
| 1-13 | 5 | −5 | 45 | 60 | −43.2 | 6.8 | 2.7 |
| 1-14 | 5 | −10 | 30 | 45 | −33.6 | 10.6 | 2.7 |
| 1-15 | 5 | 5 | 20 | 30 | −13.2 | 1.8 | 8.1 |
| 1-16 | 8 | 2 | 45 | 45 | −37.9 | 4.3 | 8.1 |

As is obvious from Table 1 and FIG. 3, when the true rake angle is larger than −43.2°, the cutting distance at which chipping occurred was 8.1 m or larger. In FIG. 3, data represented by • indicates that chipping was observed at the corresponding cutting distance, and data represented by ○ indicates that no chipping was observed at the corresponding cutting distance. Data represented by Δ indicates that the true rake angle was −33.6° and chipping occurred at the cutting distance of 2.7 m, but the major cutting edge inclination angle described below was 10.6° and was largely outside of the range of the present invention. In addition, as is obvious from Table 1 and FIG. 4, when the major cutting edge inclination angle was larger than −6.2° and smaller than 5°, the cutting distance at which chipping occurred was 8.1 m or larger.

Figure 5:
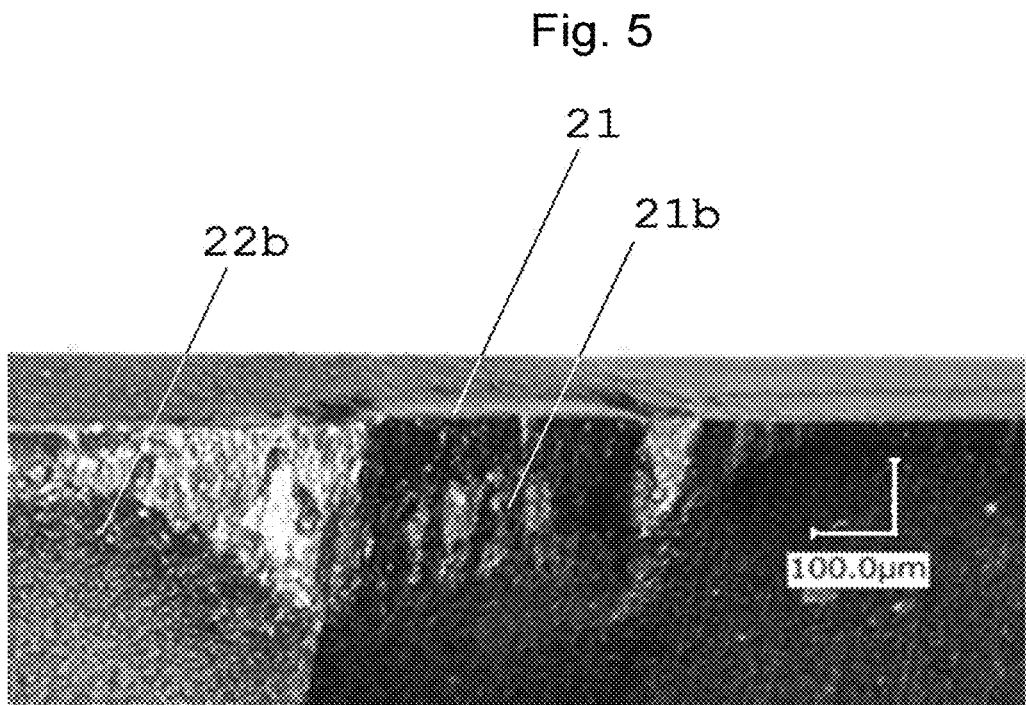
FIG. 5 is an enlarged photograph of a tip of the rotary cutting tool in Example 1 as taken when a cutting distance was 8.1 m.
Figure 6:
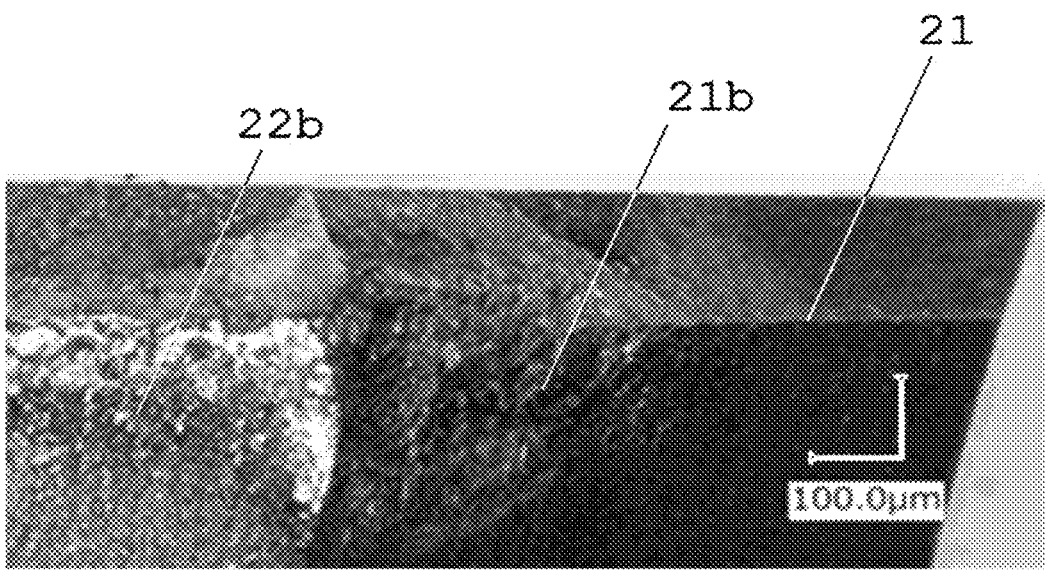
FIG. 6 is an enlarged photograph of a tip of a rotary cutting tool in Comparative Example as taken when a cutting distance was 2.7 m.

Photographs (FIG. 5, FIG. 6) of the tip (Example 1: cutting distance of 8.1 m) of Test Example 1-1 in which no chipping occurred and the tip (Comparative Example: cutting distance of 2.7 m) of Test Example 1-6 in which chipping occurred are shown, respectively. In the tip with no chipping, a relief surface 21b of the major cutting edge 21 and a relief surface 22b of the wiper insert 22 evenly wore, and the ridgeline of the major cutting edge 21 was maintained. Meanwhile, in the tip with chipping, in addition to the relief surface 21b of the major cutting edge, the major cutting edge 21 (particularly, a portion near the corner 21a formed together with the wiper insert 22) was chipped, and the ridgeline of the major cutting edge 21 was not maintained.

Example 2

Hereinafter, the rotary cutting tool of the present invention will be described in detail on the basis of Example 2. Cutting was performed using a face mill of each of Test Examples described in Table 2. For the milling cutter of each Test Example, a tip formed of CBN was used, the number of blades was sixteen for Test Example 2-1 and four for Test Example 2-2, and each outer diameter was 63 mm. In Test Example 2-1, the negative chamfer was not formed and the rake surface was composed of one surface. Meanwhile, in Test Example 2-2, the negative chamfers were respectively formed at the major cutting edge and the wiper insert, and the ridgeline at which the negative chamfers came together was formed. A plate member which was formed of a ductile cast iron FCD600 and which had a width of 25 mm was used as a workpiece, and a vertical machining center was used as a machining device. A cutting condition was such that a cutting speed Vc was 600 m/min., a feed amount per blade was 0.05 mm, and an axis direction cutting amount was 0.3 mm. At cutting distances of 13.5 m, 27 m, 54 m, and 108 m, observation as to whether or not the cutting edge of the major cutting edge of the face mill of each Test Example was chipped was performed, and the proportion of the chipped cutting edges at each cutting distance is indicated in Table 3.

TABLE 2

| Test Example | AR (°) | RR (°) | Chamfer angle (°) | Cutting edge angle (°) | True rake angle (°) | Cutting edge inclination angle (°) | Note |
|---|---|---|---|---|---|---|---|
| 2-1 | −17 | −28 | 0 | 60 | −31.5 | 0.1 | Example |
| 2-2 | 8 | 2 | 45 | 45 | −37.9 | 4.3 | Commercial product |

TABLE 3

| | Proportion (%) of chipped cutting edges | | | |
| | Cutting distance (m) | | | |
| Test Example | 13.5 | 27 | 54 | 108 |
| 2-1 | 0 | 0 | 0 | 0 |
| 2-2 | 0 | 25 | 50 | 100 |

As is obvious from Table 3, in Test Example 2-1, machining was stably performed without chipping up to the cutting distance of 108 m. Meanwhile, in Test Example 2-2, chipping started gradually increasing at the cutting distance of 13.5 m and all the cutting edges were chipped at the cutting distance of 108 m.

Figures 7, 8:
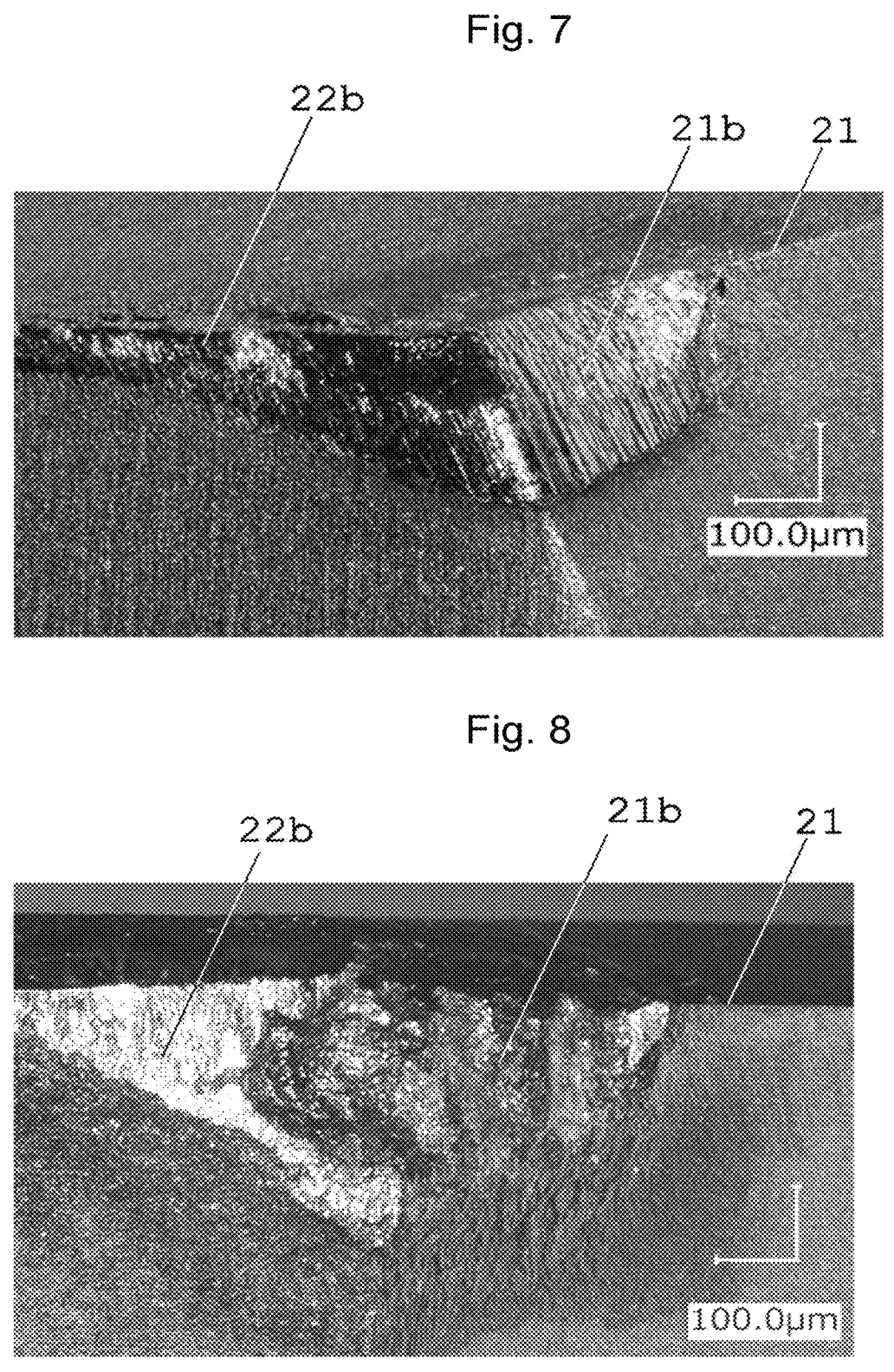

Photographs of the tip (cutting distance of 108 m) of Test Example 2-1 in which no chipping occurred and the tip (cutting distance of 108 m) of Test Example 2-2 in which chipping occurred are shown in FIG. 7 and FIG. 8, respectively. In the tip with no chipping, the relief surface 21*b* of the major cutting edge 21 and the relief surface 22*b* of the wiper insert 22 evenly wore, and the ridgeline of the major cutting edge 21 was maintained. Meanwhile, in the tip with chipping, the major cutting edge, and the ridgeline portion at which the negative chamfer surfaces formed at the major cutting edge and the wiper insert met with each other, were largely chipped.

DESCRIPTION OF THE REFERENCE CHARACTERS

1: body
11: groove

12: relief
14: front end hole
15: fitting hole
AX: rotation axis
2: tip
21: major cutting edge
21*b*: relief surface of major cutting edge
22: wiper insert
22*b*: relief surface of wiper insert
23: boundary line defining rake surface
T: true rake angle
I: major cutting edge inclination angle
E: cutting edge angle
A: axial rake
R: radial rake

The invention claimed is:

1. A rotary cutting tool comprising:
a cutting tip formed of a hard sintered body, wherein
a rake surface of the cutting tip, a portion located within about a feed amount per blade from a major cutting edge is composed of one surface, a cutting edge angle is larger than 0° and smaller than 90°, a true rake angle is not smaller than −30° and not larger than −20°, and a major cutting edge inclination angle is not smaller than −5° and smaller than +5°.

2. The rotary cutting tool according to claim 1, wherein a wiper insert is formed in a rounded convex shape.

3. The rotary cutting tool according to claim 2, wherein a length by which a most protruding center portion of the wiper insert protrudes from a line segment connecting both ends of a blade of the wiper insert is from 1 μm to 4 μm.

* * * * *